United States Patent [19]

Cox et al.

[11] 4,403,533
[45] Sep. 13, 1983

[54] HIGH ACCURACY SLITTER SYSTEM

[75] Inventors: Ernest R. Cox, Barberton; Duane E. Snyder, Jr., Akron, both of Ohio

[73] Assignee: The Firestone Tire & Rubber Company, Akron, Ohio

[21] Appl. No.: 286,229

[22] Filed: Jul. 23, 1981

[51] Int. Cl.³ .............................................. B26D 1/20
[52] U.S. Cl. ........................................, 83/56; 83/402; 83/435; 83/435.2; 83/420; 83/449; 226/97; 226/198
[58] Field of Search ..................... 83/56, 22, 402, 431, 83/435, 435.2, 434, 420, 446, 449; 226/3, 97, 198

[56] References Cited

U.S. PATENT DOCUMENTS

| | | | |
|---|---|---|---|
| 1,155,727 | 10/1915 | Harwood | 83/422 |
| 1,998,357 | 4/1935 | Carlson | |
| 3,076,366 | 2/1963 | Granstedt | 83/98 |
| 3,234,836 | 2/1966 | Buff | 83/422 X |
| 3,375,963 | 4/1968 | Wang et al. | 226/198 X |
| 3,485,128 | 12/1969 | Siegenthaler | 83/326 |
| 3,709,076 | 1/1973 | Kissell | 83/402 X |
| 3,803,959 | 4/1974 | Rung | 83/425 X |
| 4,267,754 | 5/1981 | Allaman | 83/187 |

Primary Examiner—James M. Meister
Attorney, Agent, or Firm—Ernst H. Ruf

[57] ABSTRACT

A high accuracy slitter system including both method and apparatus for aligning and cutting an elongate web of reinforced elastic material into multiple strips wherein the improved guiding apparatus includes mechanisms for both aligning the web relative to either its longitudinal center line or one of its edges while keeping the web in a generally flat condition and wherein the improved moving member includes a porous conveying member having a plurality of guide members for restraining the member against lateral movement. In a method for aligning and slitting, the improvement includes the steps of aligning the web; keeping it in a generally flat condition while aligning; and restraining the conveying member against lateral movement during slitting.

17 Claims, 8 Drawing Figures

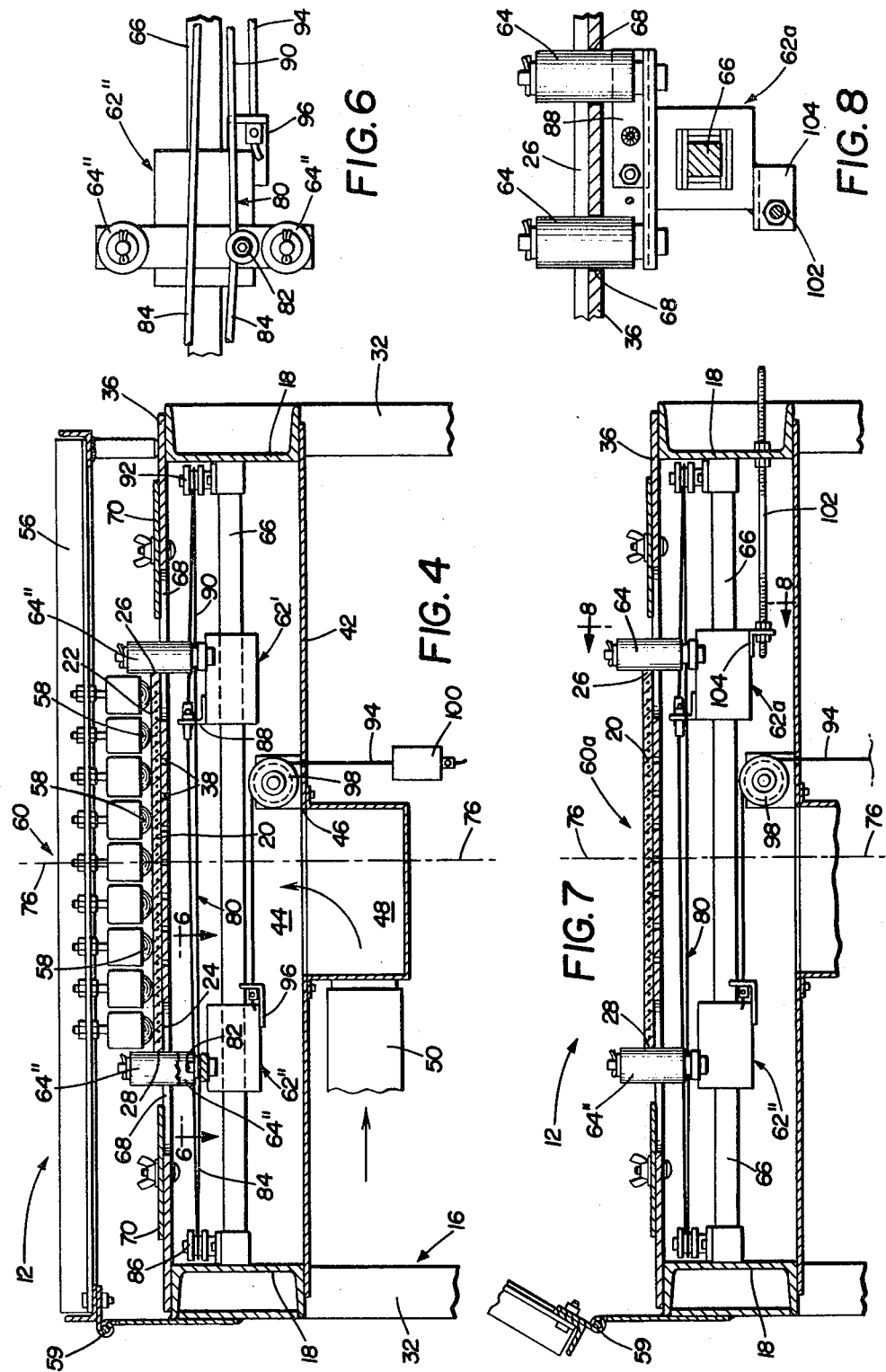

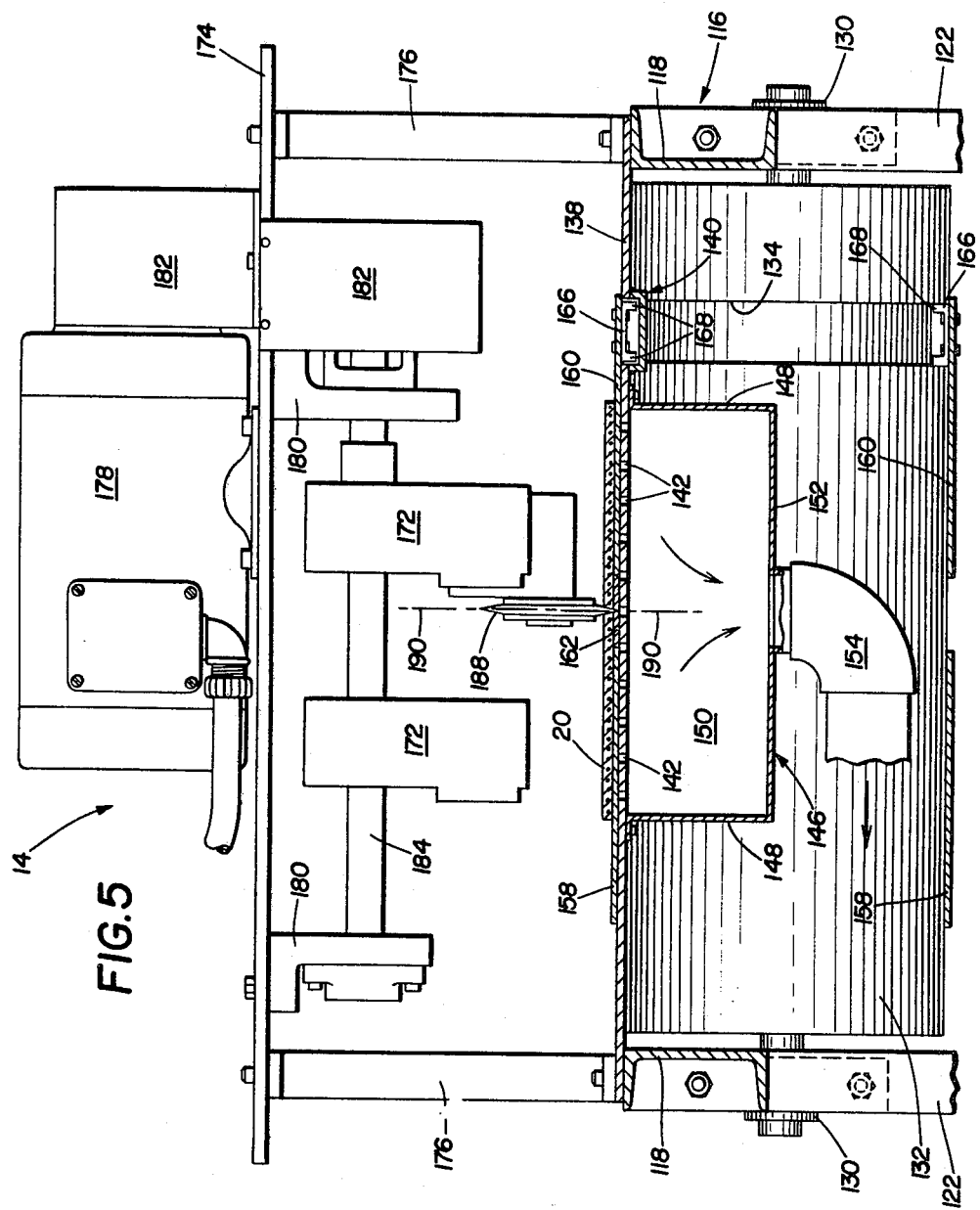

HIGH ACCURACY SLITTER SYSTEM

TECHNICAL FIELD

The field of art to which this invention pertains is that of reinforced elastic material, particularly to the aligning and cutting of an elongate web of such a material into multiple strips.

In the assembly of radial tires, the tread plies are classically produced by applying at least two plies of high bias angle material to the shaped tire body. This material is preferably of a rubber base stock whose reinforcing cord, be it textile, steel or glass fiber, is generally biased at a high angle (such as, for example 20°) relative to the mid-circumferential center plane passing through the tire. These high angle plies are either directly applied to the tire body or pre-assembled off-line and thereafter transferred to the tire body.

The prior art equipment used for making tread plies has produced less than desirable width control because of the material guiding and the cutting equipment itself. Prior guiding systems that have been used for feeding fabric or material through slitters have demonstrated an inability to hold an edge to an exact position because of the inherent oscillatory movement of the parts that mechanically guide the web.

While the prior art has used air or gas flotation, it has not appreciated the use of a moving guide that has the same velocity as the material being cut and thereby eliminating any material distortion due to friction against a stationary guide. Furthermore, the use of air flotation without additional means to keep the material to be cut in a flat condition, will produce wrinkling and center buckling so as to essentially make it impossible to achieve proper aligning via web edge guiding.

In addition, while the prior art has recognized the use and need of vacuum hold down in the area of the cutters or slitters, the hold down of the fabric to be cut relative to a moveable support means, such as a conveyor belt, is insufficient since in high bias angle cord material, the cutting forces will cause lateral movement of the support means itself.

BACKGROUND ART

U.S. Pat. No. 1,998,357 to Carlson discloses a web cutting and scoring device utilizing manually-adjustable edge guides, while U.S. Pat. No. 3,803,959 to Rung discloses web guide bars and a guide bracket wherein the former may be manually or power adjusted.

U.S. Pat. No. 3,709,076 to Kissell, et al. discloses the use of an apparatus for subdividing a body of fibers into sections wherein the apparatus uses a slotted conveyor belt having first an air cushion chamber and thereafter a reduced pressure chamber.

U.S. Pat. No. 3,076,366 to Granstedt discloses an air cushion plate together with an adjacent suction plate while U.S. Pat. No. 3,234,836 to Buff discloses a foam cutting apparatus utilizing a perforated conveyor together with a suction box.

DISCLOSURE OF THE INVENTION

The present invention provides a solution to the prior art problems pertaining to both the apparatus and method for achieving high accuracy slitting.

The improved apparatus for aligning and cutting utilizes guiding means which includes mechanisms for both aligning the fabric web relative to either its longitudinal center line or one of its edges as well as for keeping the web in a generally flat condition. Furthermore, the improved apparatus has means for moving which include a moveable porous member which in turn has means for restraining this member against lateral movement.

The preferred mechanism for aligning the web relative to its longitudinal center line includes at least two pairs of opposed rollers, interconnected via a flexible cable, wherein these rollers are in operative transversely-moveable biasing contact with the opposed edges of the web. In a further embodiment of the improved apparatus, the mechanism for aligning the web relative to one of its edges, again includes at least two pairs of opposed rollers wherein one pair of the rollers is in constant transversely-moveable biasing contact with the other web edge whereas the remaining pair of rollers is fixed against transverse movement relative to the one edge. The mechanism for keeping the web in a generally flat condition preferably includes a plurality of spaced ball rollers or casters, mounted above the web, with these rollers being adapted to engage the top surface of the web due to the flotation of the web, with these rollers also permitting ready lateral movement of the web.

In the improved apparatus of this invention the moveable porous member preferably takes the form of a conveyor belt wherein the means for restraining the member against lateral movement takes the form of a plurality of longitudinally spaced and transversely extending guide members that are attached to the lower surface of the conveyor belt. These guide members are adapted to closely fit into a recessed channel in the guiding means and into grooves in the rolls associated with the conveyor belt.

In the method for aligning and slitting an elongate web of reinforced elastic material into parallel strips, the improvement includes the steps of aligning the web relative to either its longitudinal center line or one of its edges; keeping the web in a generally flat condition during the aligning step; and restraining the advancing means against lateral movement during the slitting step.

Several non-limiting embodiments are shown by way of example in the accompanying drawings and described in detail without attempting to show all the various forms and modifications in which the invention might be embodied. The features and advantages of the present invention will become more readily understood by persons skilled in the art when following the best mode description in conjunction with several drawings.

BRIEF DESCRIPTION OF THE DRAWINGS

FIG. 4 is a vertical cross section taken substantially through the aligning unit on the plane indicated by line 4—4 of FIG. 2.

FIG. 5 is a vertical section through the conveyor and slitting unit taken substantially on the plane indicated by line 5—5 of FIG. 3.

FIG. 6 is a sectional view, with distant parts removed, taken substantially on the plane indicated by line 6—6 of FIG. 4.

FIG. 7 is a vertical sectional view similar to that of FIG. 4, but illustrating a different embodiment.

FIG. 8 is a vertical sectional view, with distant parts removed, taken substantially on the plane indicated by line 8—8 of FIG. 7.

BEST MODE FOR CARRYING OUT THE INVENTION

Figure 1:
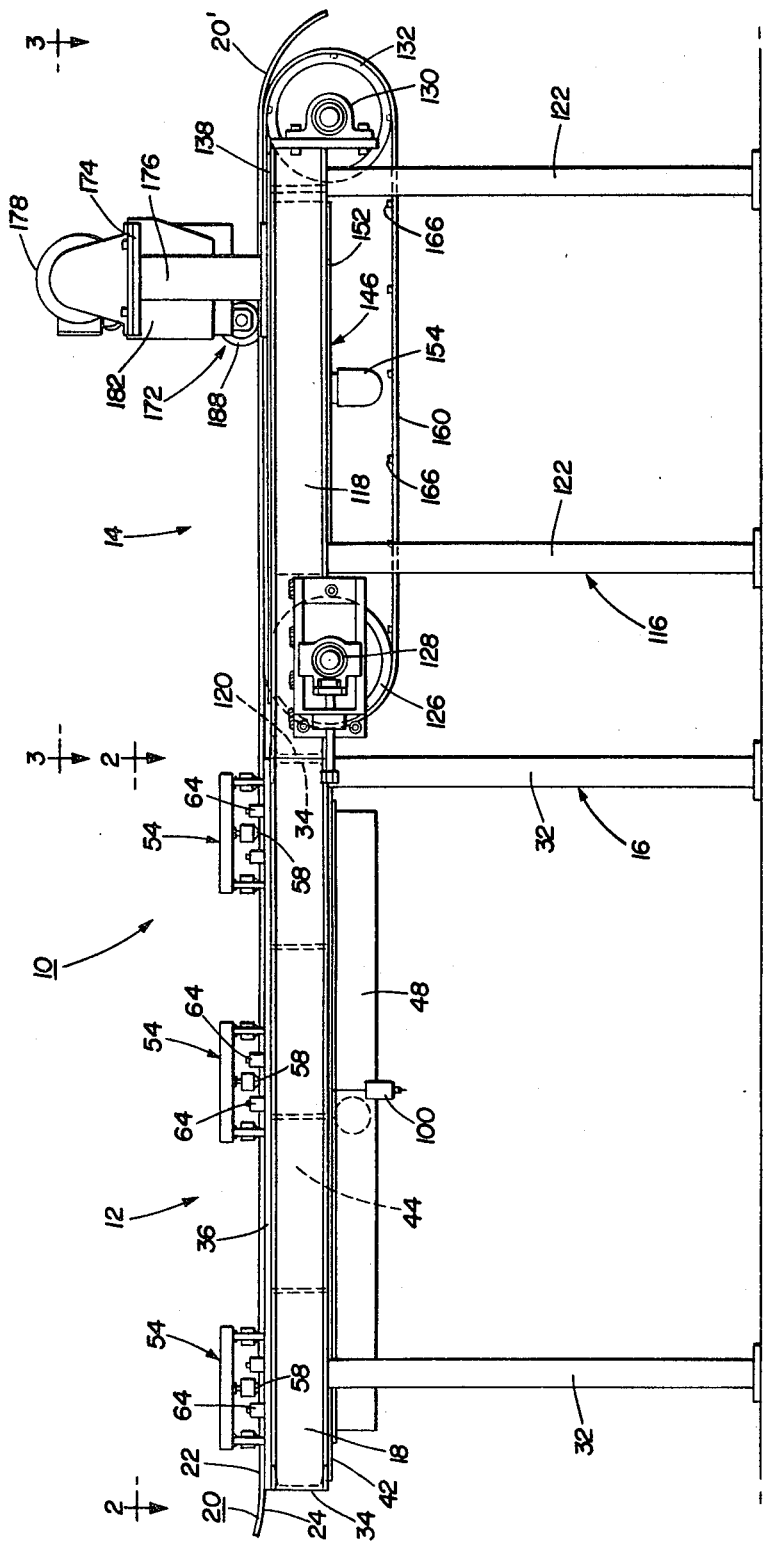
FIG. 1 is a longitudinal side elevation showing the aligning and slitting units, attached to each other, of the high accuracy slitter system of this invention.
Figure 2:
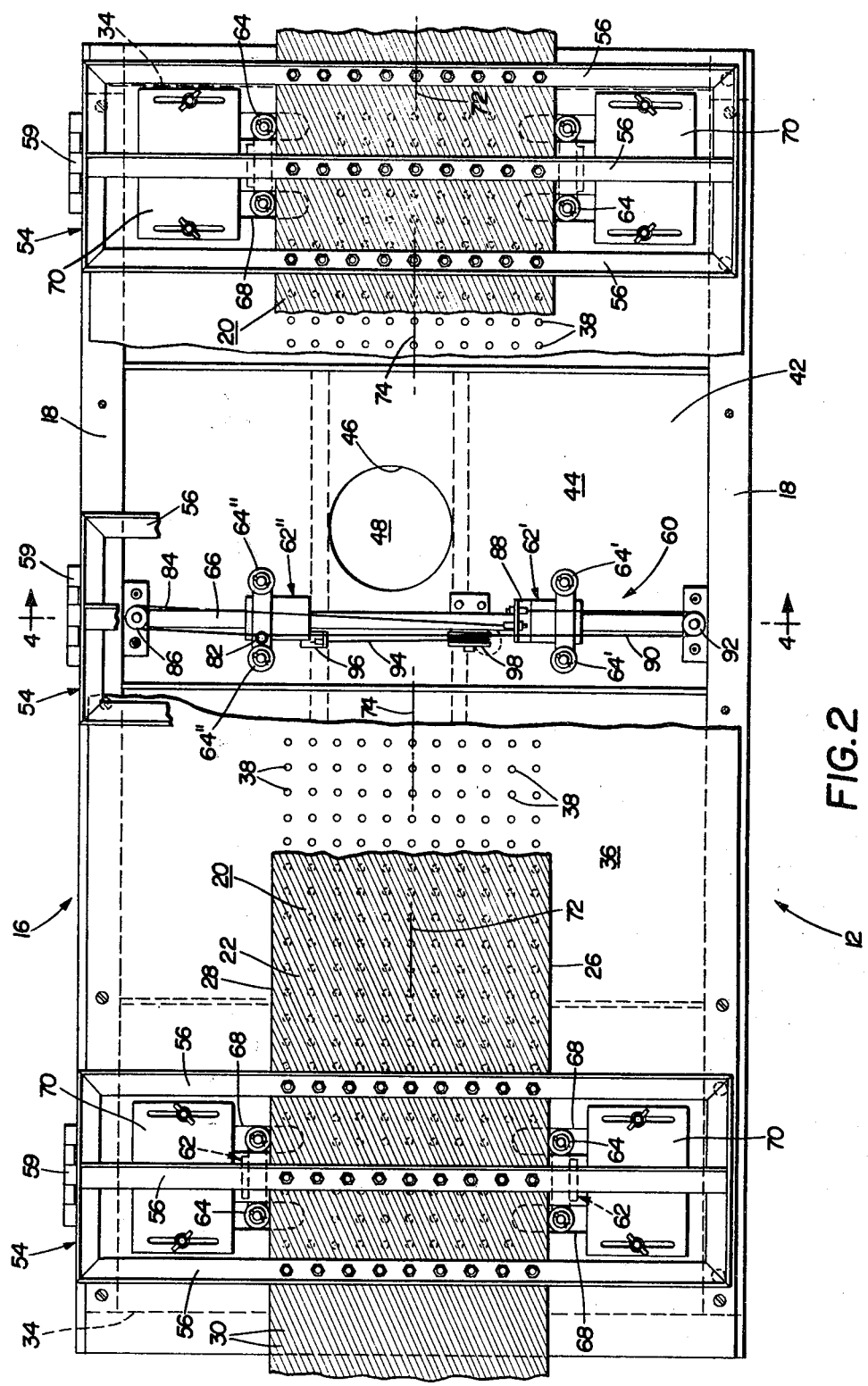
FIG. 2 is a top plan view of the aligning unit looking in the direction of arrows 2—2 of FIG. 1.
Figure 3:
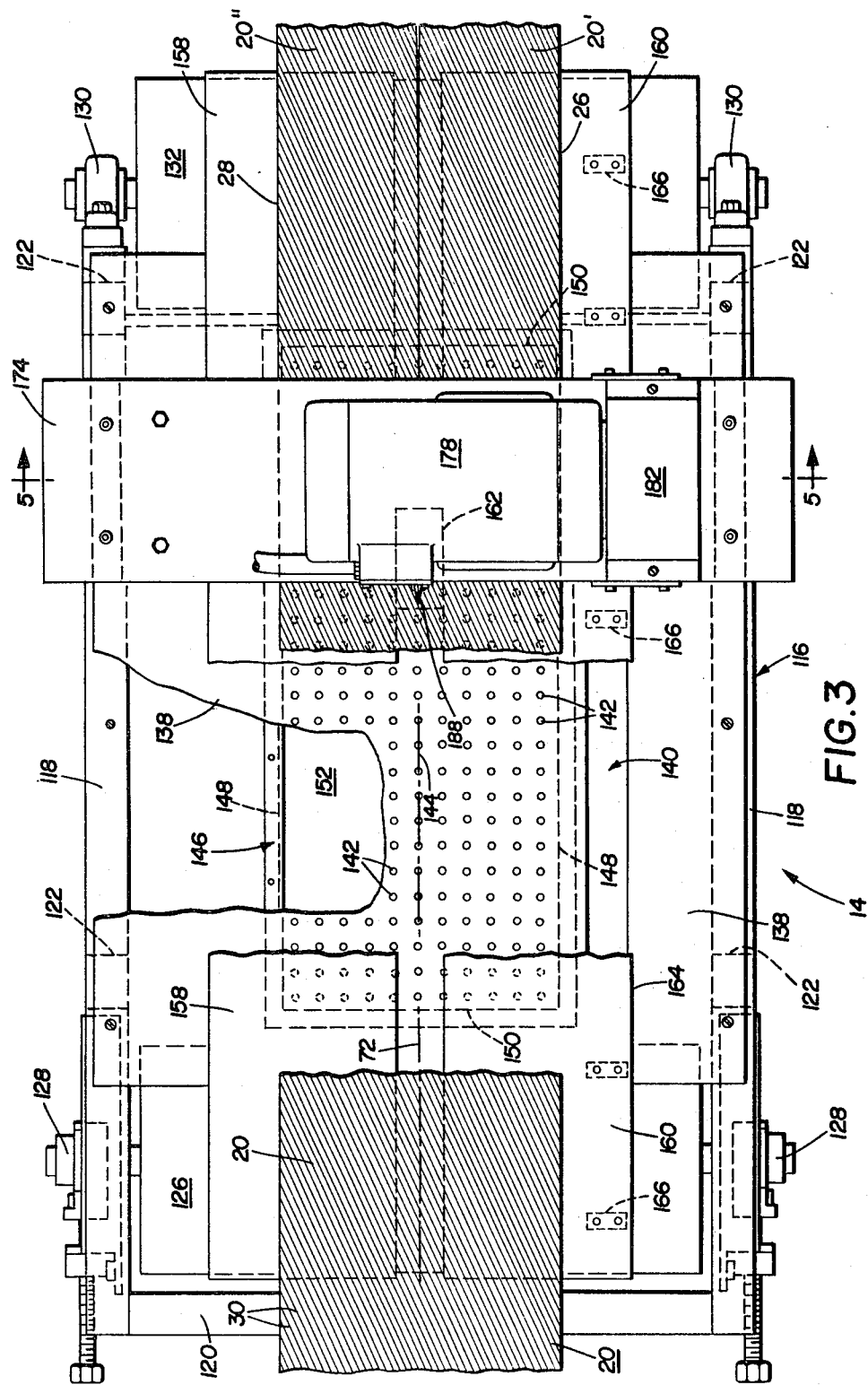
FIG. 3 is a top plan view of the conveyor and slitting unit looking in the direction of arrows 3—3 of FIG. 1.

FIG. 1 is a longitudinal side elevation showing the high accuracy slitter system 10 of the present invention as preferably including an aligning unit 12 coupled to a slitting unit 14, with top plan views thereof being shown in FIGS. 2 and 3, respectively.

Turning now specifically to FIGS. 1, 2 and 4, aligning unit 12 comprises a frame 16 which includes transversely spaced members 18 arranged lengthwise of the direction of travel of the sheet or web of material 20, with members 18 being supported on struts 32. Transversely spaced end members 34 are connected with side members 18 so as to basically produce a rectangular framework topped by a flat top plate 36 having an array of vertical apertures 38 distributed longitudinally of plate 36 and distributed of a width sufficient to at least be coincident with the width of the widest web of material 20 designed to be handled on aligning unit 12.

Closing the lower portions of side members 18 and end members 34 is a flat bottom plate 42, which together with top plate 36 and members 18 and 34 defines a chamber 44 having a plurality of large longitudinally centered openings 46 (best seen in FIG. 2) in bottom plate 42. Disposed beneath bottom plate 42, and thus chamber 44, is a receptacle 48 connected by a pipe 50 with a blower (not shown) establishing air pressure in chamber 44 via openings 46. Air pressure in chamber 44 exerts an upward force against the lower surface 24 of web 20, thereby basically providing for the air flotation of web 20 relative to top plate 36. Web 20 also has an upper surface 22, as well as having embedded therein high angle bias cord reinforcements that are often metallic in nature. Material 20 is preferably a rubber base tire tread ply material whose reinforcing cord (such as of textile, steel or glass fiber construction) is biased at a high angle (such as 20°, for example), relative to the longitudinal extent of web 20. Naturally other reinforced elastic materials, including but not limited to rubber base tire body ply material, for example, can also be processed on slitter system 10.

As best seen in FIGS. 1, 2 and 4, web top surface 22 is intermittently engaged by several arrays 54 of multiple longitudinally spaced rows 56 of transversely extending ball rollers or casters 58. Each array 54 preferably has three rows 56 of ball rollers 58, with each array being hinged at 59 to permit pivoting thereof as a unit, as best shown in a comparison of FIGS. 4 and 7. Any desired type of ball rollers may be used and preferably are vertically adjustable to permit compensation for thickness variations of web 20. The function of ball rollers 58 is to keep web 20 in a flat un-wrinkled and un-buckled condition while it is being conveyed via the noted air flotation, while at the same time permitting ready transverse or lateral movement thereof for reasons to be explained more detail hereinafter.

Again, as best shown in FIGS. 1, 2 and 4, cooperating with arrays 54 of ball rollers 58 are opposed roller guide assemblies each having a pair spaced adjacent cylindrical rollers 64 as best seen in FIGS. 6 and 8. Each roller assembly 62 is transversely slidable on a support bar 66 attached to and extending transversely between side members 18. Tandem rollers 64 extend vertically upwardly from roller guide assembly 62 through parallel slots 68 in top plate or cover 36. Adjustable protector plates 70 are utilized to minimize the entry of foreign materials through slots 68 into air chamber 44.

As best seen in FIGS. 2 and 4, the tandem rollers 64 of each guide assembly 62 are adapted to engage opposed edges 26 and 28 of web 20. Cylindrical rollers 64', mounted on roller guide assembly 62', are designed to interact with web edge 26 whereas cylindrical rollers 64", mounted on roller guide assembly 62", are adapted to engage web edge 28. The lateral positions of roller guide assemblies 62' and 62", relative to their support bar 66 is such that they are aligned, i.e., preferably equally laterally spaced, relative to the longitudinal vertical center line 74 passing through top or cover plate 36. As will become clearer as this description progresses, sheet or web of material 20 has its longitudinal center line 72 coincident with longitudinal vertical center line 74 of cover plate 36. Both of center lines 72 and 74 are also contained within the plane indicated by line 76—76 in FIG. 4. As more clearly observed in FIG. 2, roller guide assemblies 62' and 62" are operatively interconnected via a cable 80, clamped via bolt 82 to roller guide assembly 62", having a first portion 84 thereof extending from bolt 82 to terminal block 88 on roller guide assembly 62' via pulley 86. A second cable portion 90 extends from bolt 82 to terminal block 88 via a second pulley 92 secured on one end of support bar 66, with the first pulley 86 being mounted on the opposite end of support bar 66. A further cable 94 (FIG. 4) has one end thereof attached to roller guide assembly 62" via terminal block 96, with the cable 94 running over pulley 98 mounted on bottom plate 42 in chamber 44. The opposite end of cable 94 extends vertically from chamber 44 and has attached thereto a weight 100.

In operation, it should be recognized that cable 94, by reason of weight 100, tends to pull rollers 64" into engagement with web edge 28. At the same time, rollers 64', by reason of the coupling of guide assembly 62' with guide assembly 62", via cable portion 84 and pulley 86, is pulled against web edge 26. If the width of web 20 should increase, its center line 72 would remain coincident with top plate center line 74, but rollers 64" would be translated outwardly or to the left, relative to FIG. 4, with rollers 64' then being displaced an amount similar to that of rollers 64" by reason of the coupling of guide roller assemblies 62' and 62" via cable portion 90 and pulley 92. In other words, centering, aligning, or guiding mechanism 60 permits its roller guide assembly 62' and 62" to contact web edges 26 and 28, respectively, and move in equal increments toward or away from longitudinal vertical center plane 76, the latter including longitudinal center lines 72 and 74 of web 20 and top plate 36, respectively. By centering relative to the longitudinal center line 74 of aligning unit 12 (coincident with longitudinal center line 72 of web 20) the overall width tolerance of web 20 is halved and may obviate the need for an additional edge trim after the shearing or slitting operation. As best shown in FIG. 2, several guiding mechanisms 60 are utilized, each in conjunction with an array 54 of ball rollers 58.

Turning now to an alternate embodiment, FIG. 7 is essentially a simplified view of FIG. 4 and differs therefrom in that roller guide assembly 62' of the former is replaced with roller guide assembly 62a in FIG. 7. These two guides assemblies are identical in construction; however, roller guide assembly 62a is fixed against sliding or transverse movement on support bar 66 by means of a rigid restraining bar 102 affixed on one end to side member 18 and on its other end to roller guide assembly 62a via terminal block 104. This lateral fixation of roller guide assembly 62a restrains the working of cable 80 and thus, the lateral or transverse movement of roller guide assembly 62″ is determined only by the width of web 20 whose edge 28 contacts rollers 64″. These rollers of course, still act against web edge 28 by reason of the action of weight 100 acting thereon via cable 94 and pulley 98. Aligning unit 60a of FIG. 7, therefore, does not act as a centering mechanism but rather as an edge guiding mechanism that maintains a fixed distance between edge 26 and longitudinal center line 74 of top plate 36. All of the width tolerances in sheet 20 will accrue relative to its other edge 28 as will be explained in more detail hereinafter. Similar to unit 60, multiples of unit 60a are utilized, each in conjunction with an array 54 of ball rollers 58. FIGS. 6 and 8 merely provide additional details as to the structural mounting of tandem rollers 64 as well as cables 80 and 94 relative to roller guide assemblies 62. It should be understood at this time that it is the function of ball rollers 58 to keep web 20 in a generally flat condition, while it is being conveyed via air flotation, so that it can be aligned via either of the multiples of aligning unit 60 or 60a in the manner previously described.

Turning now to slitting unit 14 of the present invention, the same is best shown in FIGS. 1, 3 and 5. Slitting unit 14 comprises a frame 116 which includes transversely spaced longitudinal members 118, front end member 120 and support struts 122 attached to side members 118.

Rotatably supported in adjustable bearing assemblies 128, attached to side members 118 near front end member 120, is a transversely extending rotary front roll 126. Similarly, attached to the rear ends of side members 118, via bearing assemblies 130, is a transversely extending rotary rear roll 132. One of rolls 126, 132, preferably the latter, is driven by a power source (not shown), such as an electric motor. Each one of front and rear rolls 126, 132 respectively, is provided with an identical recessed groove 134, best seen in FIG. 5, the function of which will be explained in more detail later. Similarly, a generally rectangular cover or top plate 138, attached to side plates 118 and spaced between rolls 126 and 132, is provided with a recessed channel 140 that is longitudinally aligned with and of the same width as roll grooves 134. In addition, a longitudinal center portion of top or cover plate 138 is provided with an array of vertical apertures 142 distributed longitudinally of plate 138 and distributed of a width sufficient to at least be coincident with the width of the widest web of material 20 designed to be handled on slitting unit 14.

Disposed beneath and attached to the bottom of top plate 138 is a receptacle 146 having side walls 148, end walls 150 and bottom wall 152, the latter being connected by a pipe 154 to any desired type of vacuum pump (not shown).

Front and rear rolls 126, 132 serve to carry at least two slightly transversely spaced longitudinal endless belts 158, 160, respectively. Both belts 158 and 160 are porous in nature and at least the inner portions thereof (relative to longitudinal center line 144 of top plate 138) pass over the array of top plates apertures 142. A small back-up plate 162, having its center line coincident with top plate center line 144, is attached to top plate 138 in the area of the latter equipped with apertures 142. One of its functions is to act as a guide and separator for belts 158, 160. At least one of belts 158, 160 is provided with means for restraining it against lateral movement during the slitting operation. This restraining means preferably takes the form of a plurality of longitudinally spaced but transversely extending guide members 166 attached to the lower surface of belt 160 near the outer edge 164 thereof. Guide members 166 have depending end portions 168 that are adapted to extend or fit into top plate recessed channel 140 and roll grooves 134 with a close physical fit, therefore restraining belt 160 against undesired lateral or transverse movement thereof.

As best seen in FIGS. 1 and 5, one or more slitting or cutting assemblies 172 are mounted on slitting unit 14 vertically above top plate 138. A transversely extending bed plate 174, supported by vertical opposed struts 176, has a drive motor 178 attached to its top while depending carrier members 180 carry the necessary power transmission equipment 182 for powering transversely adjustable slitting or cutting assemblies 172 mounted on transverse support bar 184. Cutting assemblies or devices 172 form no part of the present invention and may take any desired form. One type of such a cutting device is set forth in detail in U.S. Pat. No. 3,485,128 to Siegenthaler. These cutting devices carry a rotatable circular cutting tool 188 that may have a plurality of circumferential notches of the type incidentally set forth in U.S. Pat. No. 4,267,754 to Allaman, et al. Cutting tool or slitter wheel 188 is designed to cut through or slit web 20, with back-up plate 162 being mounted directly beneath that portion of web 20 being cut or slit. The plane of rotation of tool 188 lies in the plane indicated by line 190—190 (FIG. 5), which plane also includes top plate center line 144 and web center line 72 (both shown in FIG. 3).

It should be understood that any desired type of known uncoiling equipment (not shown) precedes aligning unit 12 and that any desired type of known multiple recoiling equipment (not shown) succeeds slitting unit 14. None of this equipment forms any part of the present invention. As shown in FIG. 1, aligning and slitting units 12, 14 abut and are joined at end portions 34, 120, respectively. In operation, belts 158, 160 carry aligned web material 20 from aligning unit 12 to slitting unit 14, with longitudinal center line 74 of aligning unit top plate 36 being coincident with longitudinal center line 144 of slitting unit top plate 138. If it is desired to slit web 20 into two equal halves, top plate center lines 74, 144 will also be coincident with cutting plane 190 of cutting tool 188 as well as web center line 72. As previously noted, it is the function aligning unit 12, in the preferred embodiment, to align web center line 72 with top plate center line 74. Thereafter, web 72 is carried, via porous belts 158, 160 to slitting or cutting assembly 172, mounted over slitting unit top plate 138. The vacuum in chamber 146, acting through belts 158 and 160, causes web 20 to adhere to belts 158, 160 so that cutting, shearing or slitting can be accomplished without movement of web 20 relative to belts 158, 160. However, since the high angle cord reinforcements 30 in web 20 tends to cause lateral movement of the belts, at least one of belts 158, 160 is restrained against lateral movement by the close engagement of its guide member depending portions 168 with slitting unit top plate recessed channel 140 and with roll grooves 134 so as to positively maintain the alignment of web 20 previously obtained via aligning unit 12.

As previously discussed, preferred aligning unit 60 (FIGS. 2 and 4) can be used to center guide web 20, whereas aligning unit 60a (FIG. 7) can be used to guide web 20 relative to one edge thereof. If center guiding is utilized, and it is desired to cut web 20 into two, though not necessarily equal-width portions, one slitting or cutting assembly 172 is then utilized to cut web 20 into two webs 20' and 20" (FIG. 3) with the result that the overall width tolerance of web 20 is halved, i.e., each one of strips or webs 20' and 20" has one-half of the tolerance of web 20.

If edge guiding is desired, and if it is desired to cut web 20 into two, though not necessarily equal-width portions, then the guided-edge web portion 20' will be cut to an exact width whereas the remaining web portion 20" will have the total width tolerance of web 20. Naturally, a further slitting assembly 172 could be utilized to trim edge 28 of web 20", if so desired.

It should, of course, be understood that web 20 could be slit into more than two portions and that either center or edge guiding could be utilized. If center guiding is used and web 20 is slit into three portions, the overall width tolerance of web 20 is then halved relative to the outer two of the three web portions. Should it be desired to trim but one edge of a web 20, either center or edge guiding can be utilized in conjunction with but one conveyor belt 160, for example, since the edge to be cut can extend beyond the adjacent belt edge.

From the foregoing, it is believed that those familiar with the art will readily recognize and appreciate the novel concept and features of the present invention. Obviously, while the invention has been described in a relation to but only two embodiments, numerous variations, changes, substitutions and equivalents will present themselves to persons skilled in the art and may be made without necessarily departing from the scope and principles of this invention. As a result, the embodiments described herein are subject to various modifications, changes and the like, without departing from the scope and principles of the invention, with the scope thereof being determined solely by reference to the claims appended hereto.

What is claimed is:

1. In an apparatus for aligning and cutting an elongate web of reinforced elastic material into multiple strips which includes in combination:
   i. means, including a porous substrate, for continuously moving the web in a direction parallel to its length toward and through a cutting or slitting apparatus;
   ii. means for providing a cushion of gas between said substrate and said web to permit ready transverse movement of said web;
   iii. guiding means for aligning said web; and
   iv. means for providing a zone of reduced pressure between said substrate and said web, in said cutting or slitting apparatus, to firmly hold said web to said means for moving; wherein the improvement comprises:
      (a) said guiding means includes mechanisms for both aligning said web relative to one of its longitudinal center lines and one of its edges as well as for keeping said web in a generally flat condition; and
      (b) said means for moving includes a moveable porous member having means for restraining said member against lateral movement.

2. The improved apparatus for aligning and cutting of claim 1 wherein said mechanism for aligning said web relative to its longitudinal center line includes at least two interconnected pairs of opposed rollers in operative transversely-moveable biasing contact with said opposed edges of said web.

3. The improved apparatus for aligning and cutting of claim 2 wherein said pairs of opposed rollers are interconnected, via a flexible cable, in a manner to produce equal but opposite movements in response to web width variations.

4. The improved apparatus for aligning and cutting of claim 1 wherein said mechanism for aligning said web relative to one of its edges includes at least two pairs of opposed rollers with one pair of said rollers being in constant transversely-moveable biasing contact with the other of the web edges.

5. The improved apparatus for aligning and cutting of claim 4 wherein said other pair of said rollers is fixed against transverse movement.

6. The improved apparatus for aligning and cutting of claims 2 or 4 wherein said mechanism for keeping said web in a generally flat condition includes a plurality of spaced ball rollers or casters mounted above said web and adapted to engage the top surface of said web as a result of the cushion of gas existing between said substrate and said web, said rollers or casters also permitting ready lateral movement of said web.

7. The improved apparatus for aligning and cutting of claim 1 wherein said moveable porous member takes the form of a conveyor belt.

8. The improved apparatus for aligning and cutting of claim 7 wherein said means for restraining said member against lateral movement take the form of a plurality of longitudinally spaced and transversely extending guide members attached to the lower surface of said conveyor belt, said guide members being adapted to closely fit into a recessed channel in said porous substrate.

9. The improved apparatus for aligning and cutting of claim 1 wherein said elongate web of reinforced material comprises pneumatic tire tread ply material.

10. The improved apparatus for aligning and cutting of claim 9 wherein said tread ply material has high angle bias cord reinforcements.

11. In a method for aligning and slitting an elongate web of reinforced elastic material into multiple strips including the steps of:
   i. at least partially supporting said web on a cushion of gas acting through a porous supporting and advancing means;
   ii. aligning said web;
   iii. adhering said web to said advancing means; and
   iv. slitting said web, wherein the improvement comprises:
      (a) aligning said web relative to one of its longitudinal center lines and one of its edges;
      (b) keeping said web in a generally flat condition while aligning said web; and
      (c) restraining said advancing means against lateral movement at least during said slitting step.

12. The improved method for aligning and slitting of claim 11 wherein the step of centering said web relative to its longitudinal center line is accomplished via two interconnected pairs of opposed rollers in operative transversely-moveable biasing contact with the opposed edges of said web.

13. The improved method for aligning and slitting of claim 11 wherein the step of aligning said web relative to one of its edges is accomplished via at least two pairs of opposed rollers with one pair of said rollers being in constant transversely-moveable biasing contact with the other of its edges.

14. The improved method for aligning and slitting of claims 12 or 13 wherein the step of keeping said web in a generally flat condition, while aligning said web, is accomplished via a plurality of spaced ball rollers or casters mounted above said web and adapted to engage the top surface of said web.

15. The improved method for aligning and slitting of claim 11 wherein the step of restraining said advancing means against lateral movement is accomplished by providing said advancing means with a plurality of longitudinally spaced and transversely extending guide members, said guide members being adapted to closely fit into a channel in said supporting means.

16. The improved method for aligning and slitting of claim 11 wherein said elastic sheet comprises pneumatic tire tread ply material.

17. The improved method for aligning and slitting of claim 16 wherein said tread ply material has high angle bias cord reinforcements.

* * * * *